(12) United States Patent
Shinnaka

(10) Patent No.: US 8,493,457 B2
(45) Date of Patent: Jul. 23, 2013

(54) MANAGING DEVICE WITH RECALCULATION, IMAGE FORMATION PROCESSING SYSTEM, COMPUTER READABLE MEDIUM STORING PROGRAM, AND IMAGE FORMING METHOD

(75) Inventor: Yosuke Shinnaka, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 601 days.

(21) Appl. No.: 12/702,459

(22) Filed: Feb. 9, 2010

(65) Prior Publication Data

US 2011/0050924 A1 Mar. 3, 2011

(30) Foreign Application Priority Data

Aug. 27, 2009 (JP) ................................. 2009-196623

(51) Int. Cl.
*H04N 5/232* (2006.01)
*H04N 5/228* (2006.01)

(52) U.S. Cl.
USPC .................. 348/211.6; 348/207.2; 348/222.1

(58) Field of Classification Search
USPC ........................................... 348/207.2, 211.6
See application file for complete search history.

(56) References Cited

U.S. PATENT DOCUMENTS

| 6,064,836 A * | 5/2000 | Nakamura et al. ................. 399/8 |
| 6,674,545 B1 * | 1/2004 | Atsumi .......................... 358/1.9 |
| 7,430,605 B2 * | 9/2008 | Quach et al. ................... 709/229 |
| 7,884,954 B2 * | 2/2011 | Endoh .......................... 358/1.15 |
| 8,306,877 B2 * | 11/2012 | Iburg et al. ...................... 705/28 |

FOREIGN PATENT DOCUMENTS

| JP | 7-0319646 A | 12/1995 |
| JP | 3478008 B2 | 2/1998 |
| JP | 2000-047534 A | 2/2000 |
| JP | 2005-266120 A | 9/2005 |
| JP | 2008-152138 A | 7/2008 |

* cited by examiner

*Primary Examiner* — Ngoc-Yen Vu
(74) *Attorney, Agent, or Firm* — Sughrue Mion, PLLC

(57) ABSTRACT

A managing device includes a request receiver that receives a request for use of an image forming apparatus, the request containing information concerning a user; an upper limit value determining unit that, upon receiving the request for use by the request receiver, determines an upper limit value for image formation processing on the basis of limiting information of a user group to which the user belongs; and a transmitter that transmits information providing an instruction to inhibit the image formation processing to an image forming apparatus whose image formation processing cannot be limited based on the upper limit value determined by the upper limit value determining unit when the processing upper limit value is less than a threshold value.

5 Claims, 5 Drawing Sheets

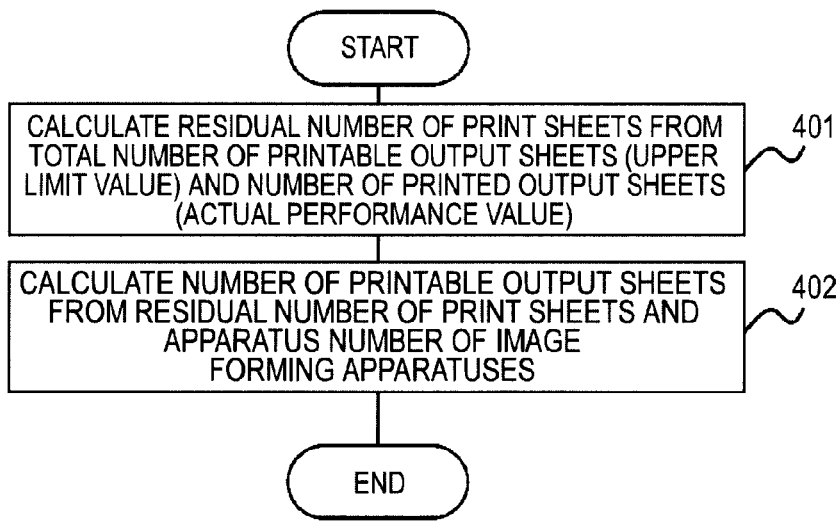
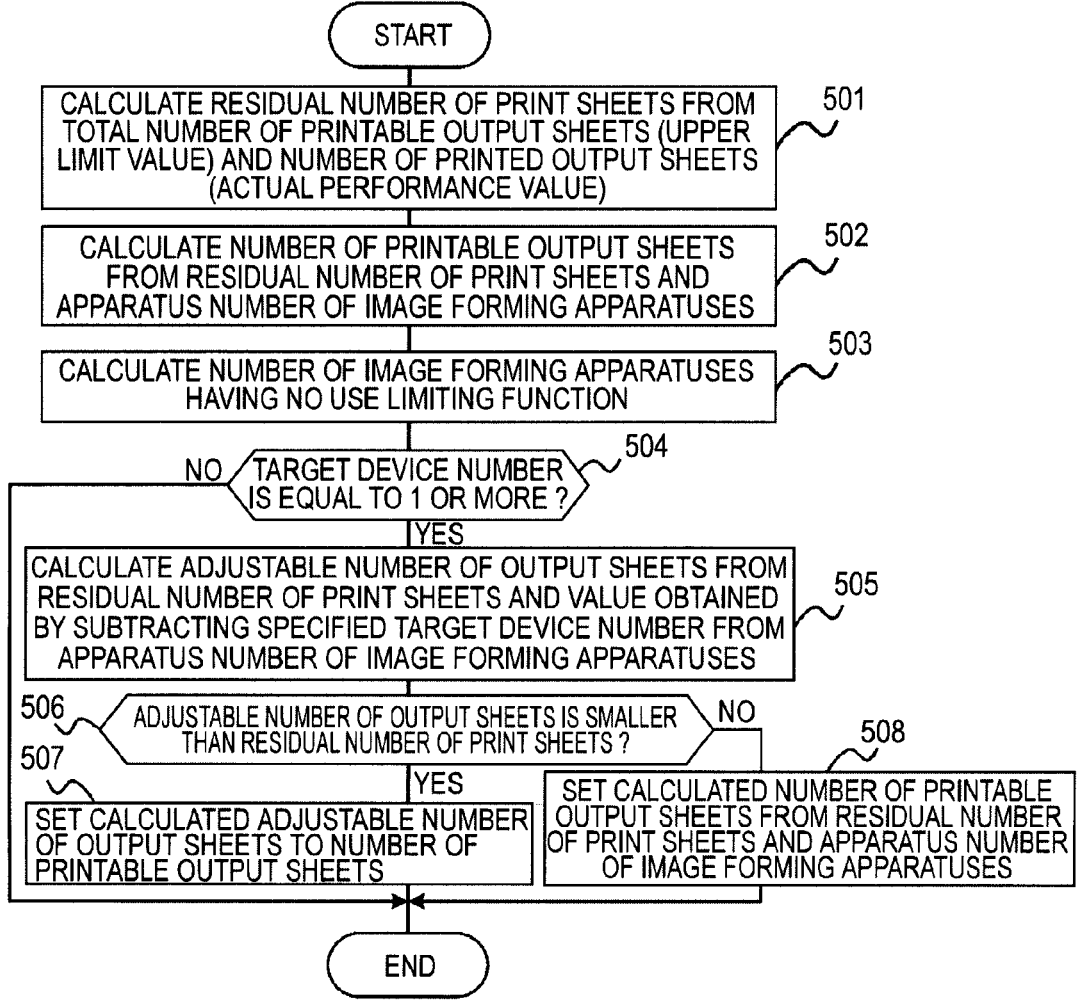

FIG.6

| GROUP INFORMATION 601 | USER INFORMATION 602 | TOTAL NUMBER OF PRINTABLE OUTPUT SHEETS (UPPER LIMIT VALUE) 603 | NUMBER OF PRINTED OUTPUT SHEETS (ACTUAL PERFORMANCE VALUE) 604 |
|---|---|---|---|
| GROUP A | USER 1 | 100 | 20 |
| GROUP A | USER 2 | 100 | 20 |
| GROUP A | USER 3 | 100 | 20 |
| GROUP B | USER 3 | 200 | 55 |
| GROUP B | USER 4 | 200 | 55 |
| GROUP C | USER 2 | 100 | 32 |
| GROUP C | USER 5 | 100 | 32 |
| ... | ... | ... | ... |

FIG.7

| APPARATUS ID 701 | USE LIMITING FUNCTION ADAPTABLE STATE 702 | USABLE USER GROUP 703 |
|---|---|---|
| IMAGE FORMING APPARATUS A | ADAPTIVE | GROUP A, GROUP B |
| IMAGE FORMING APPARATUS B | ADAPTIVE | ALL |
| IMAGE FORMING APPARATUS C | NON-ADAPTIVE | GROUP A, GROUP C |
| IMAGE FORMING APPARATUS D | ADAPTIVE | ALL |
| IMAGE FORMING APPARATUS E | ADAPTIVE | ALL |

MANAGING DEVICE WITH RECALCULATION, IMAGE FORMATION PROCESSING SYSTEM, COMPUTER READABLE MEDIUM STORING PROGRAM, AND IMAGE FORMING METHOD

CROSS-REFERENCE TO RELATED APPLICATIONS

This application is based on and claims priority under 35 USC 119 from Japanese Patent Application No. 2009-196623 filed on Aug. 27, 2009.

BACKGROUND

Technical Field

The present invention relates to a managing device, an image formation processing system, a computer readable medium storing a program, and an image forming method.

SUMMARY

According to an aspect of the present invention, there is provided a managing device including: a request receiver that receives a request for use of an image forming apparatus, the request containing information concerning a user; an upper limit value determining unit that, upon receiving the request for use by the request receiver, determines an upper limit value for image formation processing on the basis of limiting information of a user group to which the user belongs; and a transmitter that transmits information providing an instruction to inhibit the image formation processing to an image forming apparatus whose image formation processing cannot be limited based on the upper limit value determined by the upper limit value determining unit when the processing upper limit value is less than a threshold value.

BRIEF DESCRIPTION OF THE DRAWINGS

Exemplary embodiments of the present invention will be described in detail based on the following figures, wherein:

FIG. 4 is a flowchart showing the detailed flow of proration processing executed in the use limit managing server according to the exemplary embodiment of the present invention;

FIG. 5 is a flowchart showing the detailed flow of re-proration processing executed in the use limit managing server according to the exemplary embodiment of the present invention;

FIG. 6 is a diagram showing an example of processing limit information; and

FIG. 7 is a diagram showing an example of a device information.

DETAILED DESCRIPTION

Exemplary embodiment of a managing device, an image forming system and a program according to the present invention will be described hereunder with reference to the accompanying drawings.

Figure 1:
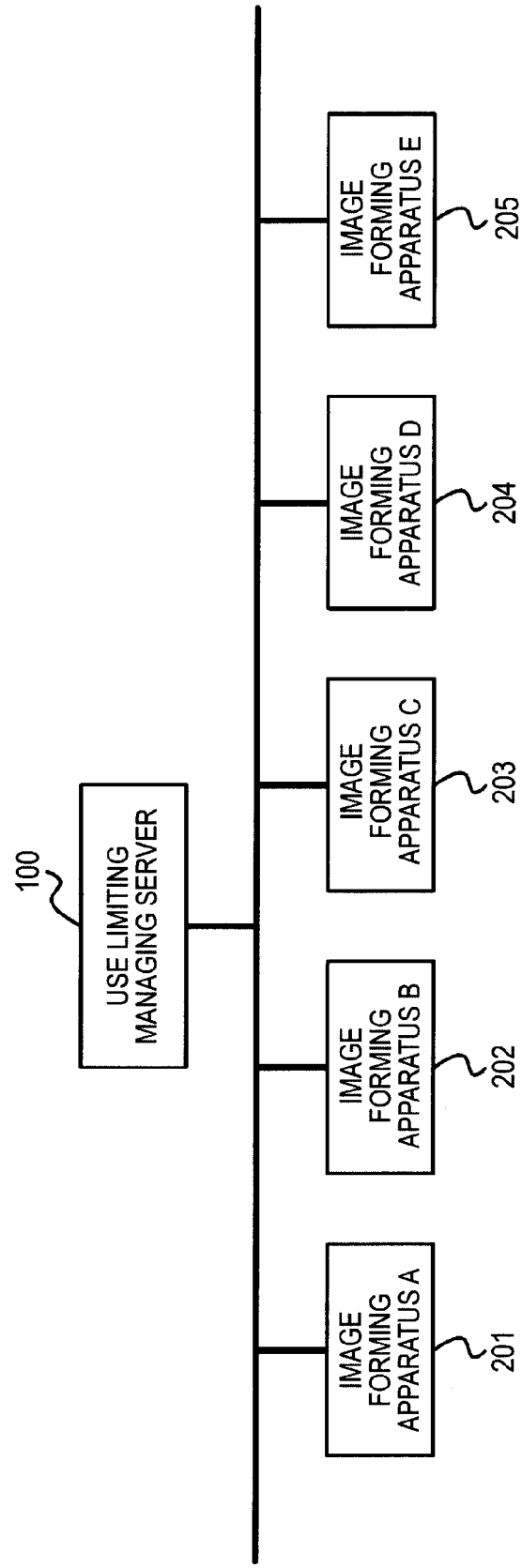
FIG. 1 is a diagram showing an example of the construction of an image forming apparatus configured by applying a managing device, an image forming system and a program according to an exemplary embodiment of the present invention.

FIG. 1 is a diagram showing an example of the device configuration of an image forming apparatus configured by applying a managing device, an image forming system and a program of an exemplary embodiment according to the present invention.

In FIG. 1, the image forming system includes an image forming apparatus A (Step 201), an image forming apparatus B (Step 202), an image forming apparatus C (Step 203), an image forming apparatus D (Step 204), an image forming apparatus E (Step 205) (hereinafter generically referred to as "image forming apparatus 200"), and a use limit managing server 100 which are connected to one another through a network line so that mutual communications can be performed among them.

The use limit managing server 100 manages user information concerning operators (users) who can use the image forming apparatus 200, and group information concerning user groups to which respective users belong. The respective user groups are managed while "processing limit information" of the image formation processing in the image forming apparatus 200 is associated with each of the user groups.

The use limit managing server 100 limits use of the image forming apparatus 200 by each user on the basis of the managed processing limited information when the user uses the image forming apparatus 200.

The image forming apparatus 200 executes image formation processing such as printing processing, reading processing, facsimile processing, etc. on the basis of a using request from a user, and it is an example of a device for executing these image formation processing.

A user information reading terminal (IC card reader) or the like is installed in the image forming apparatus 200, and it reads user information from an IC card or the like of a user using this image forming apparatus 200, and receives user information input by using a client PC (not shown) existing on a network to execute processing of performing user certification by using the user information concerned through communications with a use limit managing server 100.

The user limit managing server 100 receiving the user information executes the user certification based on the user information, and executes the user limit processing based on the processing limiting information which is set in association with a user group to which the certified user belongs. At this time, the certified user is set to be in a state that the user logins into the image forming apparatus (login state).

In this use limiting processing is determined a processing condition under which print and output can be performed by each image forming apparatus into which another user belonging to the same user group as the certified user logins. For example, the number of printable output sheets which can be printed and output by the image forming apparatus is calculated, and the calculated number of printable sheets is determined as the processing condition.

The processing to be executed when the number of printable output sheets is set as the processing condition will described below.

Accordingly, the use limiting processing is assumed to be executed while the number of print output sheets is limited to the number of printable output sheets.

Furthermore, on the basis of the calculated number of printable output sheets, use of the image forming apparatus is permitted (permission response) or use of the image forming apparatus is prohibited (prohibition response).

The number of printable output sheets is calculated by the use limiting processing. However, this exemplary embodiment is not limited to this style. For example, information such as the number of printable sheet (paper) faces, etc. may be determined by calculation, and the use range may be limited on the basis of this information. The numerical information used for the use limitation applied to the image forming apparatus such as printable output sheets or the number of printable sheet (paper) faces is referred to as "processing upper limit value".

In a case where this use limiting processing is executed, when an image forming apparatus into which a user logins has a use limiting function, the image forming apparatus makes not only a permission response or a rejection response in the use limiting processing, but also a response on the number of printable output sheets calculated by the use limiting processing when the permission response is made. Furthermore, in the case of an image forming apparatus having no use limiting function (for example, a device which can permit or prohibit the whole function with respect to the print output function, however, cannot permit use of the image formation processing within a predetermined number of sheets or sheet (paper) faces (i.e., prohibit use of the image formation processing beyond the predetermined number of sheets or sheet (paper) faces, that is, a device which cannot limit the image formation processing on the basis of the processing upper limit value), only a permission response or rejection response is made.

As described above, with respect to the image forming apparatus 200 for which a permission response or rejection response is made from the use limit managing server 100, when the response is "permission response", the current login state is based on the certified user, and thus the image formation processing (for example, the print processing or copy processing) is executed in response to a use request from the certified user concerned.

When the number of printable output sheets is specified in the permission response, the image formation processing (print processing) is executed within the number of printable output sheets concerned.

On the other hand, when the response from the use limit managing server 100 is "prohibition response", the image formation processing is stopped and the processing is finished.

When "prohibition response" is made in the case as described above, an indication "image formation processing is impossible because of use limitation" may be displayed on the display of the image forming apparatus 200. When this indication is displayed, candidates of other image forming apparatuses which can perform image formation processing may be displayed.

Figure 2:
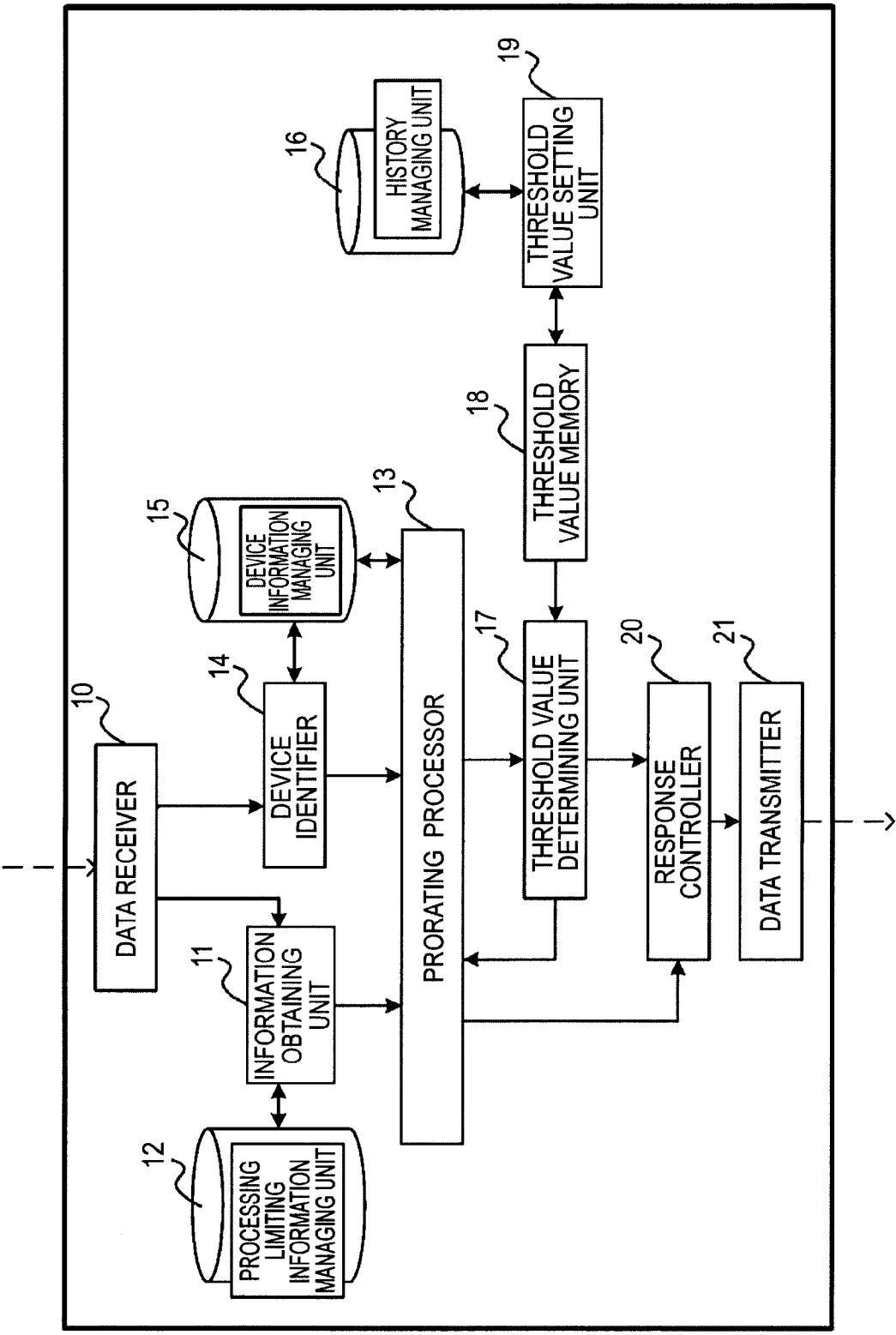
FIG. 2 is a diagram showing the detailed construction of a use limit managing server 100 according to the exemplary embodiment of the present invention.
Figure 3:
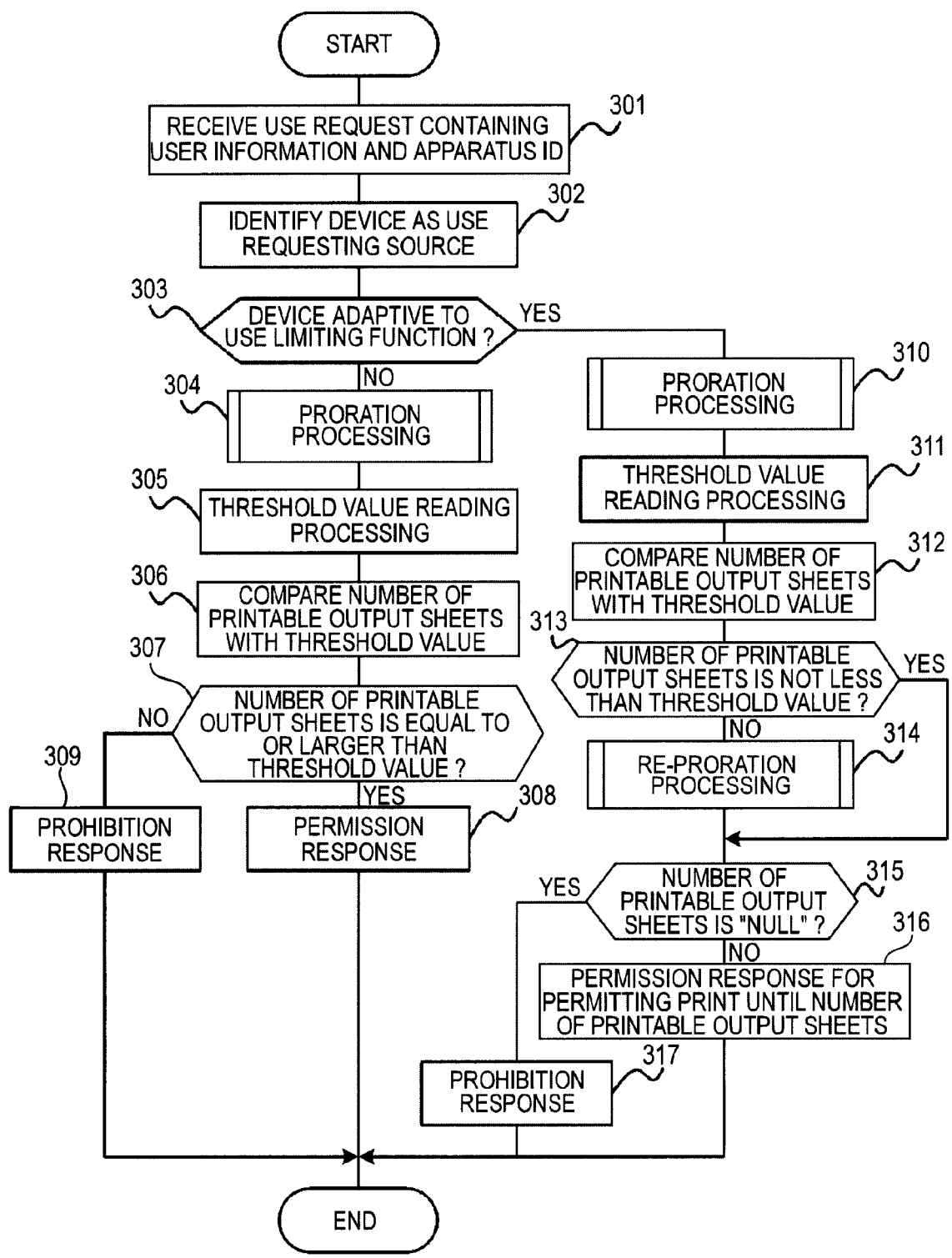
FIG. 3 is a flowchart showing the detailed processing executed in the use limit managing server in the exemplary embodiment of the present invention.

FIG. 2 shows the detailed construction of the use limit managing server 100 at this time, and FIG. 3 shows the flow of the detailed processing executed in the use managing server 100.

FIG. 2 is a diagram showing the detailed construction of the use limit managing server 100 according to this exemplary embodiment of the present invention.

In FIG. 2, the use limit managing server 100 has a data receiver 10, an information obtaining unit 11, a processing limiting information managing unit 12, a prorating processor 13, a device identifier 14, a device information managing unit 15, a history managing unit 16, a threshold value determining unit 17, a threshold value memory 18, a threshold value setting unit 19, a response controller 20 and a data transmitter 21.

When a use request containing user information and device identification information (called as "device ID") for identifying the image forming apparatus from the image forming apparatus 200 is received by the data receiver 10, the data receiver 10 notifies these information to the device identifier 14 and the information obtaining unit 11.

In the device identifier 14, it is identified on the basis of the device ID contained in the use request (on the basis of the device information managed by the device information managing unit 15) whether the image forming apparatus as a use request source is an image forming apparatus having the use limiting function therein or an image forming apparatus having no use limiting function therein, and sets an identification result into the device type.

The device information managing unit 15 manages the device information shown in FIG. 7, for example. The device information is information concerning an image forming apparatus which is targeted to be subjected to use limitation. As shown in FIG. 7, the device information includes a [device ID] item 701 for identifying the image forming apparatus, a [use limiting function adaptive state] item 702 for indicating the adaptive state to the use limiting function, and a (usable user group] item 703 which can use the image forming apparatus.

For example, since the [device ID] item 701 shown in FIG. 7 is [image forming apparatus A], the [use limiting function adaptive condition] item 702 is [adaptive] and the [usable user group] item 703 is [group A, group B], it is indicated that the [image forming apparatus A] is [adaptive] to the use limiting function, and user groups which can use the image forming apparatus A is [group A] and [group B].

That is, it is indicated from FIG. 6 that users who can use the image forming apparatus A are four users of [user 1], [user 2] and [user 3] belonging to [group A], and [user 3] and [user 4] belonging to [group B]. It is also indicated that [user 3] belongs to both [group A] and [group B].

On the basis of the device information as described above, the device type identified by the device identifier 14 is notified to the prorating processor 13.

The use limiting function is a function of limiting use of the image forming apparatus on the basis of information (for example, information concerning the number of printable sheets in print output) received from the use limit managing server 100, and restricts print output over the number of printable output sheets.

On the basis of user information contained in a use request received from the data receiver 10, the information obtaining unit 11 obtains from the processing limiting information managing unit 12 the processing limiting information set to a user group to which the user in the user information belongs.

The processing limiting information managing unit 12 manages group information concerning user groups to which respective users belong, and further manages processing limiting information for the group information. The processing limiting information includes information concerning the total number (upper limit value) of printable output sheets which all the users belonging to each user group can print out by using the image forming apparatus 200 and information concerning the number of printed output sheets (actual performance value) which the users belonging to each user group have printed out by using the image forming apparatus 200, and this processing is information representing the limitation of the image formation processing which is imposed on the user group (for example, information representing the number of print-out sheets or sheet (paper) faces which is permitted to the user group).

FIG. 6 shows an example of the processing limiting information in this case.

The processing limiting information shown in FIG. 6 has a table configuration including a [group information] item 601, a [user information] item 602, a [total number of printable output sheets (upper limit value)] item 603, and a [number of printed output sheets (actual performance value)] item 604.

The [group information] item 601 represents user groups. In the example shown in FIG. 6, [group A], [group B] and [group C] are specified as the user groups. The [user information] item 602 represents information of users (names and user identification numbers), and it specifies users belonging to the user groups indicated in the [group information] item 601.

Furthermore, the [total number of printable output sheets (upper limit value)] item 603 represents the upper limit value of the number of printable output sheets which is set to each user group and can be printed out as a whole by all the users belonging to the user group concerned. The [number of printed output sheets (actual performance value)] item 604 represents the actual performance value (the number of actually printed output sheets which are printed through the image formation processing by the users belonging to the user group).

As the processing limiting information shown in FIG. 6, for example, "100" is set as the upper limit value of the users [user 1], [user 2] and [user 3] belonging to the user group [user A], and "20" is set as the actual performance value of the users [user 1], [user 2] and [user 3].

The information obtaining unit 11 which obtains the processing limiting information as described above notifies the prorating processor 13 of the group information concerning the group to which the user belongs and the processing limiting information.

The prorating processor 13 executes proration processing on the basis of the device type identified in the device identifier 14 and the processing limiting information notified by the information obtaining unit 11.

The proration processing subtracts the number of printed output sheets from the total number of printable output sheets to calculate the residual number of print sheets, and divides the calculated residual number of print sheets by the number of image forming apparatuses into which a user making a use request and other users of a user group to which the user concerned belongs login, thereby calculating the adjusted number of printable output sheets, whereby the number of printable output sheets which can be printed out by each image forming apparatus is calculated.

The flowchart of FIG. 4 shows the details of the proration processing.

In addition to the method of dividing the residual printable output sheets by the number of image forming apparatuses (apparatus number) in which the use-requesting user and the other users of the user group to which the user concerned belongs are logging, there may be used a method of dividing the residual printable output sheets by the number of image forming apparatuses in which the use limiting function is installed, the number of image forming apparatuses belonging to an apparatus group in such a case that each apparatus group is set to image forming apparatuses or the number of image forming apparatuses in which a use-requesting user is logging, thereby calculating the number of the printable output sheets. As described above, the divisor used for the division to calculate the printable output sheets in each image forming apparatus will be referred to as "the number of limitation target image forming apparatuses").

The history managing unit 16 manages history information of the image formation processing for each user, and the history information includes information concerning a processing date and hour at which the image formation processing is executed, the number of print-out sheets, an image forming apparatus executing the image formation processing, etc.

The information concerning the number of print-out sheets which is calculated for each image forming apparatus as described above is notified to the threshold value determining unit 17 together with the device type.

The threshold value determining unit 17 reads out a threshold value as permission information stored in the threshold value memory 18, and compares the read-out threshold value with the number of printable output sheets received from the prorating processor 13 to determine, for each of the device types, whether the number of print-out sheets exceeds (is equal to or more than) the threshold value or not.

The threshold value memory 18 stores the threshold value as the permission information for permitting the image formation processing in the image forming apparatus having no use limiting function therein.

Accordingly, when it is determined by the threshold value determining unit 17 that the number of printable output sheets received from the prorating processor 13 exceeds (is equal to or more than) the threshold value stored in the threshold value memory 18, printing is permitted. On the other hand, when it is determined that the number of printable output sheets received from the prorating processor 13 does not exceed (i.e., less than) the threshold value, printing is prohibited.

The threshold value stored in the threshold value memory 18 is set by a threshold value setting unit 19.

The threshold value setting unit 19 sets the threshold value on the basis of the history information of the image formation processing in the image forming apparatus 200 which is managed by the history managing unit 16.

The threshold value setting unit 19 calculates the average number of print-out sheets on the basis of the number of print-out sheets of the history information managed in the history managing unit 16, for example, and sets the calculated average number of print-out sheets as the threshold value. Alternatively, the average number of print-out sheets thus calculated is multiplied by a fixed rate (for example, 20%, 30%, 50%, 70% or the like) and the calculation result is set as the threshold value. Furthermore, the maximum value or minimum value of the number of printable output sheets of the history information may be set as the threshold value.

The determination is executed for each of device types by using the threshold value as described above in the threshold value determining unit 17. When the device type indicates an image forming apparatus which is not adaptive to the use limiting function, and when the device type indicates an image forming apparatus adaptive to the use limiting function and also the number of printable output sheets exceeds the threshold value stored in the threshold value memory 18, a determination result is notified to the response controller 20.

On the other hand, when the device type indicates an image forming apparatus adaptive to the use limiting function and also the number of printable output sheets does not exceed the threshold value stored in the threshold value memory 18, proration processing (re-proration processing) is requested to the prorating processor 13 again. According to this re-proration processing, when the number of printable output sheets in an image forming apparatus which is not adaptive to the use limiting function is determined to be less than the threshold value and thus use of the image forming apparatus concerned is prohibited, the number of printable output sheets which is prorated to the image forming apparatus concerned so that the image forming apparatus concerned can perform printing is made to be usable by an image forming apparatus adaptive to the use limiting function.

The detailed re-proration processing at this time is shown in the flowchart of FIG. 5.

In the response controller 20, when the device type indicates an image forming apparatus having no use limiting function and the identification result indicates that the number of printable output sheets is equal to or more than the threshold value, a permission response is transmitted through the data transmitter 21 to an image forming apparatus which makes a use request. When the identification result indicates that the number of printable output sheets is less than the threshold value, a prohibition response is transmitted through the data transmitter 21 to an image forming apparatus which makes a use request.

In the response controller 20, when the device type indicates an image forming apparatus having the use limiting function and the image forming apparatus does not have the number of printable output sheets, a prohibition response is transmitted through the data transmitter 21 to the image forming apparatus making the use request. When the image forming apparatus has the number of printable output sheets, a permission response for permitting printing until the number of printable output sheets is transmitted through the data transmitter 21 to the image forming apparatus making the use request.

The detailed flow of the processing in the use limit managing server 100 is shown in FIG. 3.

FIG. 3 shows a flowchart showing the detailed processing flow executed in the use limit managing server according to the exemplary embodiment of the present invention.

In FIG. 3, when a use request containing certified user information and an apparatus ID is received (Step 301), the device type is identified on the basis of the apparatus ID of the use request (Step 302). It is determined on the basis of the identified device type whether the image forming apparatus is an image forming apparatus having the use limiting function (Step 303). When it is not determined that the image forming apparatus is an image forming apparatus having the use limiting function ("No" in Step 303), the proration processing of calculating the number of the printable output sheets which can be printed and output by the image forming apparatus is executed (Step 304).

The detailed flow of the proration processing is shown in the flowchart of FIG. 4.

FIG. 4 is a flowchart showing the detailed flow of the proration processing executed in the use limit managing server according to the exemplary embodiment according to the present invention.

In FIG. 4, first, the number of printed output sheets (actual performance value) is subtracted from the total number of printable output sheets (upper limit value) which is set to a user group to which a user belongs, thereby calculating the residual number of print sheets (Step 401). In the example of FIG. 6, when the certified user is [user 1], the use group to which the [user 1] belongs is [group A], and thus the residual number of print sheets is calculated as "80" by subtracting the number of printed output sheets (actual performance value) "20" from the total number of printable output sheets (upper limit value) "100".

When the residual number of print sheets is calculated as described above, then the number of printable output sheets is calculated from the residual number of print sheets and the apparatus number of the image forming apparatuses (Step 402). The [user 1] having the residual number of print sheets [80] calculated on the basis of the example shown in FIG. 6 belongs to the user group [group A], and thus according to the apparatus information of FIG. 7, [user 1] belonging to [group A] can use all the five image forming apparatuses (the image forming apparatus A, the image forming apparatus B, the image forming apparatus C, the image forming apparatus D and the image forming apparatus E).

When the residual number of print sheets "80" is divided by [five] apparatuses, the number of printable output sheets per image forming apparatus is calculated as "16" sheets. When the calculated number of printable output sheets has fractional parts, an integer value from which these fractional parts are discarded is set as the number of printable output sheets.

When the number of printable output sheets is calculated according to the proration processing based on the flowchart as shown in FIG. 4, the information concerning the threshold value for determining permission or non-permission (prohibition) of print output is read in (Step 305), and upon read-in of the information on the threshold value, the threshold value and the number of printable output sheets are compared with each other (Step 306).

On the basis of the comparison result, it is determined whether the number of printable output sheets is equal to or larger than the threshold value (Step 307). When it is determined that the number of printable output sheets is equal to or larger than the threshold value ("YES" in Step 307), a permission response for permitting print processing is made to an image forming apparatus as a use requesting source in which the use limiting function is not installed (step 308).

That is, when the read-in threshold value is smaller than the calculated number of printable output sheets "16", the image formation processing in the image forming apparatus having no use limiting function is permitted.

On the other hand, when it is not determined that the number of printable output sheets is equal to or more than the threshold value and thus the number of printable output sheets is smaller than the threshold value ("NO" in Step 307), a prohibition response for prohibiting print processing is made to an image forming apparatus as the use request source having no use limiting function (Step 309).

That is, when the read-in threshold value is larger than the calculated number of printable output sheets "16", the image formation processing in the image forming apparatus having no use limiting function is prohibited.

This is because it is assumed that the number of printable output sheets would be easily overrun by the image formation processing unless the number of printable output sheets is equal to or more than the threshold value.

Next, when the determination result as to whether the image forming apparatus as the use request source has the use limiting function indicates that the image forming apparatus has the use limiting function ("YES in Step 303), the proration processing of calculating the number of printable output sheets which can be printed out by the image forming apparatus is executed (Step 310).

The detailed flow of this proration processing is the same as the flowchart of FIG. 4.

When the number of printable output sheets is calculated according to the proration processing based on the flowchart as shown in FIG. 4, the information concerning the threshold value for determining permission or non-permission of print output is subsequently read in (Step 311).

When the information on the threshold value is read, the threshold value and the calculated number of printable output sheets are compared with each other (Step 312).

On the basis of the comparison result, it is determined whether the number of printable output sheets is equal to or more than the threshold value (Step 313). When it is not determined that the number of printable output sheets is equal to or more than the threshold value ("NO" in Step 313), that is, when the use of the image forming apparatus having no use limiting function is prohibited, the re-proration processing is executed (Step 314).

In the foregoing example, the number of printable output sheets is equal to "16", and for example when the read-in threshold value is larger than the number of printable output sheets "16", the image formation processing of the image forming apparatus having no use limiting function is prohibited, and thus the re-proration processing is executed.

The detailed flow of this re-proration processing is shown in the flowchart of FIG. 5.

FIG. 5 is a flowchart showing the detailed flow of the re-proration processing executed in the use limit managing server according to this exemplary embodiment.

According to this re-proration processing, when the number of printable output sheets in each image forming apparatus which is calculated in the proration processing (the step 310 of the flowchart shown in FIG. 3) is not equal to the threshold value or more and thus the use of image forming apparatus having no use limiting function is prohibited, the number of printable output sheets which is prorated to the image forming apparatus is prorated to image forming apparatuses having the use limiting function again.

In FIG. 5, the number of printed output sheets (actual performance value) is subtracted from the total number of printable output sheets (upper limit value) set to a use group to which a user belongs, thereby calculating the residual number of printable output sheets (Step 501). In the example of FIG. 6, when the certified user is [user 1], the user group to which [user 1] belongs is [group A], and thus the residual number of print sheets is calculated as "80" by subtracting the number of printed output sheets (actual performance value) "20" from the total number of printable output sheets (upper limit value) "100".

When the residual number of print sheets is calculated as described above, the number of printable output sheets is calculated from the residual number of print sheets and the apparatus number of the image forming apparatuses (Step 502).

Since [user 1] of the residual number of print sheets "80" calculated on the basis of the example shown in FIG. 6 belongs to the user group [group A], [user 1] belonging to [group A] can use all the five image forming apparatuses (the image forming apparatus A, the image forming apparatus B, the image forming apparatus C, the image forming apparatus D, the image forming apparatus E) from the apparatus information shown in FIG. 7.

Accordingly, when the residual number of print sheets "80" is divided by "5" apparatuses, the number of printable output sheets per image forming apparatus is calculated as "16" sheets. When the calculated number of printable output sheets has fractional parts, an integer value obtained by discarding the fractional parts is set as the number of printable output sheets.

When the number of printable output sheets is calculated as described above, the number of image forming apparatuses each of which has no use limiting function is calculated (Step 503). Then, it is determined whether the number of the image forming apparatuses having no use limiting function is equal to one or more (Step 504). When it is determined that the number of the image forming apparatuses having no use limiting function is equal to one or more ("YES" in Step 504), the calculated number of the image forming apparatuses having no use limiting function is subtracted from the apparatus number of all the image forming apparatuses to determine the apparatus number of image forming apparatuses having the use limiting function, and the adjustable number of output sheets is calculated from the thus-determined apparatus number and the residual number of print sheets (Step 505).

In the example of FIG. 7, it is indicated that [image forming apparatus c] has no use limiting function (i.e., is not adaptive to the use limiting function). Therefore, the number of the image forming apparatuses having the use limiting function is equal to "four", and the residual number of print sheets is equal to "80". Accordingly, the residual number of print sheets "80" is divided by "four", whereby the adjustable number of output sheets per image forming apparatus is calculated as "20" sheets.

Subsequently, it is determined whether the adjustable number of output sheets is equal to or smaller than the residual number of print sheets (Step 506). When it is determined that the adjustable number of output sheets is equal or smaller than to the residual number of print sheets ("YES" in Step 506), that is, in the example described above, the adjustable number of output sheets is equal to "20" and the residual number of print sheets is equal to "80", so that it is determined that the adjustable number of output sheets is equal to the residual number of print sheets or less. In this case, the calculated adjustable number of output sheets is set to the number of printable output sheets (Step 507).

On the other hand, when the adjustable number of output sheets is larger than the residual number of printable sheets ("NO" in Step 506), the image formation processing based on the number of printable output sheets which is calculated from the residual number of print sheets and the apparatus number of image forming apparatuses is set (Step 508).

When the number of printable output sheets is calculated as described above, it is subsequently determined whether the number of printable output sheets at this time is "null" (Step 315). When it is determined that the number of printable output sheets calculated through the proration processing is equal to the threshold value or more ("YES" in 313), it is determined whether the number of printable output sheets is "null" without executing the re-proration processing (Step 315).

When it is determined on the basis of the above determination that the number of printable output sheet is equal to "0" and thus "null" ("YES" in 315), the prohibition response for prohibiting the print processing is made to the image forming apparatus as the use request source having the use limiting function (Step 317).

Furthermore, when the number of printable output sheets is equal to a predetermined number or more ("NO" in Step 315), the permission response for permitting the image formation processing (print processing) until the number of printable output sheets is made to the image forming apparatus as the use requesting source having the use limiting function (Step 316).

The present invention is not limited to the exemplary embodiment described above, and various modifications may be properly made without departing from the subject matter of the present invention.

According to the exemplary embodiment described above, an image forming system having a communicating function may be caused to execute the operation described above, or a program constituting the above functions may be installed in a computer from a recording medium (CD-ROM, DVD-ROM or the like) storing the program to execute the program, whereby the image forming system executing the above-described processing can be configured. A computer constituting the image forming system includes CPU (Central Processing Unit), ROM (Read Only Memory), RAM (Random Access Memory) and a hard disk which are connected to one another through a system bus. CPU executes the processing according to a program stored in ROM or the hard disk by using RAM as a working area.

Furthermore, a medium for supplying a program may be a communication medium (a medium for holding temporarily or in a fluctuating style like a communication line, a communication system or the like). For example, the program concerned is displayed on an electronic bulletin board (BBS: Bulletin Board Service) of the communication network and distributed through a communication line.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best explain the skilled in the art to understand the invention for various exemplary embodiments and with the various modifications as are suited to the particular use contemplated. It is intended that the scope of the invention be defined by the following claims and their equivalents.

What is claimed is:

1. A managing device comprising:
   a request receiver that receives a request for use of an image forming apparatus, the request containing information concerning a user;
   an upper limit value determining unit that, upon receiving the request for use by the request receiver, determines an upper limit value for image formation processing on the basis of limiting information of a user group to which the user belongs; and
   a transmitter that transmits information providing an instruction to inhibit the image formation processing to an image forming apparatus whose image formation processing cannot be limited based on the upper limit value determined by the upper limit value determining unit when the processing upper limit value is less than a threshold value,
   wherein the upper limit value determining unit determines the upper limit value for the image formation processing on the basis of the limiting information of the user group to which the user belongs and the number of image forming apparatuses whose image formation processing is to be limited, and redetermines an upper limit value on the basis of the number of image forming apparatuses whose image formation processing cannot be limited based on the upper limit value, out of the image forming apparatuses whose image formation processing is to be limited when the upper limit value determined by the upper limit value determining unit is less than the threshold value, and when the upper limit value is redetermined by the upper limit value determining unit, the transmitter transmits information concerning the redetermined upper limit value to image forming apparatuses whose image formation processing can be limited based on the upper limit value, and transmits information providing an instruction to inhibit the image formation processing to image forming apparatuses whose image formation processing cannot be limited based on the upper limit value.

2. A managing device comprising:
   a managing unit that manages processing limiting information for limiting image formation processing for each of user groups to which a user belongs;
   a request receiver that receives a request for use of an image forming apparatus, the request containing information concerning a user;
   an upper limit value determining unit that, upon receiving the request for use by the request receiver, determines an upper limit value for image formation processing on the basis of processing limiting information of a user group to which the user belongs; and
   a transmitter that transmits information providing an instruction to permit the image formation processing to an image forming apparatus whose image formation processing cannot be limited based on the upper limit value determined by the upper limit value determining unit when the upper limit value is equal to or more than a threshold value,
   wherein the upper limit value determining unit determines the upper limit value for the image formation processing on the basis of the limiting information of the user group to which the user belongs and the number of image forming apparatuses whose image formation processing is to be limited, and redetermines an upper limit value on the basis of the number of image forming apparatuses whose image formation processing cannot be limited based on the upper limit value, out of the image forming apparatuses whose image formation processing is to be limited when the upper limit value determined by the upper limit value determining unit is less than the threshold value, and when the upper limit value is redetermined by the upper limit value determining unit, the transmitter transmits information concerning the redetermined upper limit value to image forming apparatuses whose image formation processing can be limited based on the upper limit value, and transmits information providing an instruction to inhibit the image formation processing to image forming apparatuses whose image formation processing cannot be limited based on the upper limit value.

3. An image formation processing system comprising an image forming apparatus and a managing device, wherein;
   the image formation processing held by the image forming apparatus cannot be limited based on an upper limit value; and
   the managing device comprises:
      a managing unit that manages processing limiting information for limiting the image formation processing for each of user groups to which a user belongs,
      a processing request receiver that receives a request for use of an image forming apparatus, the request containing information concerning the user,
      an upper limit value determining unit that, upon receiving the request for use by the request receiver, determines the upper limit value for the image formation processing on the basis of the processing limiting information of the user group to which the user belongs, and
      a transmitter that transmits information providing an instruction to inhibit the image formation processing to the image forming apparatus whose image formation processing cannot be limited based on the upper limit value when the upper limit value determined by the upper limit value determining unit is less than a threshold value, and the image forming apparatus includes an inhibiting unit that inhibits the image formation processing on the basis of the information that is transmitted by the transmitter, wherein the upper limit value determining unit determines the upper limit value for the image formation processing on the basis of the limiting information of the user group to which the user belongs and the number of image forming apparatuses whose image formation processing is to be limited, and redetermines an upper limit value on the basis of the number of image forming apparatuses whose image formation processing cannot be limited based on the upper limit value, out of the image forming apparatuses whose image formation processing is to be limited when the upper limit value determined by the upper limit value determining unit is less than the threshold value, and when the upper limit value is redetermined by the upper limit value determining unit, the transmitter transmits information concerning the redetermined upper limit value to image forming apparatuses whose image formation processing can be limited based on the upper limit value, and transmits information providing an instruction to inhibit the image formation processing to image forming apparatuses whose image formation processing cannot be limited based on the upper limit value.

4. A computer readable medium storing a program causing a computer to execute a process for image formation processing, the process comprising:

receiving a request for use of an image forming apparatus, the request containing information concerning a user;

upon receiving the request for use, determining an upper limit value for image formation processing on the basis of limiting information of a user group to which the user belongs; and transmitting information providing an instruction to inhibit the image formation processing to an image forming apparatus whose image formation processing cannot be limited based on the determined upper limit value when the processing upper limit value is less than a threshold value, wherein the upper limit value is determined for the image formation processing on the basis of the limiting information of the user group to which the user belongs and the number of image forming apparatuses whose image formation processing is to be limited, and an upper limit value is redetermined on the basis of the number of image forming apparatuses whose image formation processing cannot be limited based on the upper limit value, out of the image forming apparatuses whose image formation processing is to be limited when the upper limit value determined by the upper limit value determining unit is less than the threshold value, and when the upper limit value is redetermined, the information is transmitted concerning the redetermined upper limit value to image forming apparatuses whose image formation processing can be limited based on the upper limit value, and the information transmitted provides an instruction to inhibit the image formation processing to image forming apparatuses whose image formation processing cannot be limited based on the upper limit value.

5. An image forming method comprising:

receiving a request for use of an image forming apparatus, the request containing information concerning a user;

upon receiving the request for use, determining an upper limit value for image formation processing on the basis of limiting information of a user group to which the user belongs; and transmitting information providing an instruction to inhibit the image formation processing to an image forming apparatus whose image formation processing cannot be limited based on the determined upper limit value when the processing upper limit value is less than a threshold value, wherein the upper limit value is determined for the image formation processing on the basis of the limiting information of the user group to which the user belongs and the number of image forming apparatuses whose image formation processing is to be limited, and an upper limit value is redetermined on the basis of the number of image forming apparatuses whose image formation processing cannot be limited based on the upper limit value, out of the image forming apparatuses whose image formation processing is to be limited when the upper limit value determined by the upper limit value determining unit is less than the threshold value, and when the upper limit value is redetermined, the information is transmitted concerning the redetermined upper limit value to image forming apparatuses whose image formation processing can be limited based on the upper limit value, and the information transmitted provides an instruction to inhibit the image formation processing to image forming apparatuses whose image formation processing cannot be limited based on the upper limit value.

\* \* \* \* \*